(12) United States Patent
Amanullah et al.

(10) Patent No.: US 11,041,347 B1
(45) Date of Patent: Jun. 22, 2021

(54) COMPOSITION AND METHOD OF MANUFACTURING OF WHOLE AND GROUND DATE PALM SEED LOST CIRCULATION MATERIAL (LCM)

(71) Applicant: Saudi Arabian Oil Company, Dhahran (SA)

(72) Inventors: Md Amanullah, Dhahran (SA); Turki Al-Subaie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/842,469

(22) Filed: Apr. 7, 2020

(51) Int. Cl.
*E21B 21/00* (2006.01)
*C09K 8/035* (2006.01)
*B07B 1/00* (2006.01)

(52) U.S. Cl.
CPC ............ *E21B 21/003* (2013.01); *C09K 8/035* (2013.01); *B07B 1/00* (2013.01); *C09K 2208/04* (2013.01)

(58) Field of Classification Search
None
See application file for complete search history.

(56) References Cited

U.S. PATENT DOCUMENTS

| | | |
|---|---|---|
| 2,483,936 A | 10/1949 | Roberts |
| 2,600,404 A | 6/1952 | Hoeppel |
| 2,749,308 A | 6/1956 | Beckum et al. |
| 2,779,417 A | 1/1957 | Clark, Jr. et al. |
| 2,789,948 A | 4/1957 | Tronolone |
| 2,811,488 A | 10/1957 | Nestle et al. |
| 2,912,380 A | 11/1959 | Groves |
| 2,943,679 A | 7/1960 | Scott, Jr. |
| 2,943,680 A | 7/1960 | Scott et al. |
| 3,147,127 A | 9/1964 | Shannon |
| 3,217,801 A | 11/1965 | Fast et al. |
| 4,086,098 A | 4/1978 | Le Ruyet et al. |
| 4,110,225 A | 8/1978 | Cagle |
| 4,127,548 A | 11/1978 | Alexander |
| 4,247,403 A | 1/1981 | Foley et al. |

(Continued)

FOREIGN PATENT DOCUMENTS

| | | |
|---|---|---|
| AU | 2014223850 B2 | 9/2014 |
| CN | 101311243 A | 11/2008 |

(Continued)

OTHER PUBLICATIONS

Ramasamy, Jothibasu et al.; "Novel Fibrous Lost Circulation Materials Derived from Deceased Date Tree Waste" SPE-187989-MS, SPE Kingdom of Saudi Arabia Annual Technocal Symposium & Exhibition, Dammam, Apr. 24-27, 2017; pp. 1-8.

(Continued)

*Primary Examiner* — Andrew Sue-Ako
(74) *Attorney, Agent, or Firm* — Bracewell LLP; Constance G. Rhebergen; Brian H. Tompkins

(57) ABSTRACT

A lost circulation material (LCM) that includes whole date palm seeds and chips formed from ground date palm seeds. The whole and ground date palm seed LCM includes chips having lengths in the range of greater than 1 micrometer (μm) to less than 6730 μm. Method of manufacturing the whole and ground date palm seed LCM include washing and drying whole date palm seeds, such that the drying includes air-drying, hot rolling, and cooling. Methods of reducing lost circulation are also provided.

9 Claims, 2 Drawing Sheets

(56) References Cited

U.S. PATENT DOCUMENTS

| | | | |
|---|---|---|---|
| 4,275,788 A | 6/1981 | Sweatman |
| 4,428,844 A | 1/1984 | Wagener |
| 4,474,665 A | 10/1984 | Green |
| 4,579,668 A | 4/1986 | Messenger |
| 4,619,772 A | 10/1986 | Black et al. |
| 4,836,940 A | 6/1989 | Alexander |
| 4,957,166 A | 9/1990 | Sydansk |
| 5,004,553 A | 4/1991 | House et al. |
| 5,114,893 A | 5/1992 | Hughes |
| 5,118,664 A | 6/1992 | Burts, Jr. |
| 5,197,324 A | 3/1993 | Keys |
| 5,332,724 A | 7/1994 | Burts, Jr. |
| 5,484,028 A | 1/1996 | Rose |
| 5,501,275 A | 3/1996 | Card et al. |
| 5,801,127 A | 9/1998 | Duhon, Sr. |
| 6,016,879 A | 1/2000 | Burts, Jr. |
| 6,098,712 A | 8/2000 | Burts, Jr. |
| 6,102,121 A | 8/2000 | Burts, Jr. |
| 6,271,001 B1 | 8/2001 | Clarke et al. |
| 6,350,594 B1 | 2/2002 | Clarke et al. |
| 6,518,224 B2 | 2/2003 | Wood |
| 6,716,798 B1 | 4/2004 | Burts, Jr. |
| 6,750,179 B1 | 6/2004 | Burts, Jr. |
| 6,790,812 B2 | 9/2004 | Halliday |
| 6,806,232 B1 | 10/2004 | Cart |
| 6,814,798 B2 | 11/2004 | Vijn et al. |
| 6,861,392 B2 | 3/2005 | Shaarpour |
| 6,932,158 B2 | 8/2005 | Burts |
| 7,226,895 B2 | 6/2007 | Xiang |
| 7,271,131 B2 | 9/2007 | Halliday et al. |
| 7,284,611 B2 | 10/2007 | Reddy et al. |
| 7,297,662 B2 | 11/2007 | Verret |
| 7,297,663 B1 | 11/2007 | Kilchrist et al. |
| 7,332,026 B2 | 2/2008 | Fyten et al. |
| 7,488,705 B2 | 2/2009 | Reddy et al. |
| 7,507,692 B2 | 3/2009 | Xiang |
| 7,537,054 B2 | 5/2009 | Reddy et al. |
| 7,541,317 B2 | 6/2009 | Pomerleau |
| 7,629,297 B2 | 12/2009 | Shaarpour |
| 7,744,689 B2 | 6/2010 | Hojaji et al. |
| 7,795,184 B2 | 9/2010 | Pomerleau |
| 7,902,126 B1 | 3/2011 | Burts, Jr. |
| 7,923,413 B2 | 4/2011 | Ghassemzadeh |
| 7,964,537 B2 | 6/2011 | Rayborn, Sr. et al. |
| 8,371,381 B2 | 2/2013 | Shindgikar et al. |
| 8,383,558 B2 | 2/2013 | Reddy et al. |
| 8,404,622 B2 | 3/2013 | Ghassemzadeh |
| 8,673,825 B2 | 3/2014 | Rayborn, Sr. et al. |
| 8,739,872 B1 | 6/2014 | Miller et al. |
| 8,776,882 B2 | 7/2014 | Shindgikar et al. |
| 8,887,808 B2 | 11/2014 | Kumar et al. |
| 8,935,957 B2 | 1/2015 | Kulkarni et al. |
| 8,992,670 B1 | 3/2015 | Vohra |
| 9,140,118 B2 | 9/2015 | Kulkarni et al. |
| 9,175,529 B2 | 11/2015 | Jamison et al. |
| 9,290,687 B1 | 3/2016 | Weaver |
| 9,410,066 B2 | 8/2016 | Ghassemzadeh |
| 9,416,306 B2 | 8/2016 | Savari et al. |
| 9,453,156 B2 | 9/2016 | Wu |
| 9,505,659 B2 | 11/2016 | Bickbau |
| 9,592,488 B2 | 3/2017 | Yusuf et al. |
| 9,623,067 B1 | 4/2017 | Awad et al. |
| 9,688,901 B2 | 6/2017 | Fontenot |
| 9,783,727 B2 | 10/2017 | Lahman et al. |
| 9,957,433 B2 | 5/2018 | Amanullah et al. |
| 10,240,411 B1 | 3/2019 | Amanullah |
| 10,259,982 B2 | 4/2019 | Amanullah |
| 10,266,742 B1 | 4/2019 | Amanullah et al. |
| 10,323,170 B1 | 6/2019 | Amanullah et al. |
| 10,329,470 B1 | 6/2019 | Amanullah et al. |
| 10,336,930 B2 | 7/2019 | Amanullah |
| 10,414,965 B2 | 9/2019 | Amanullah |
| 10,479,920 B2 | 11/2019 | Amanullah et al. |
| 10,494,558 B2 | 12/2019 | Amanullah |
| 10,513,647 B2 | 12/2019 | Amanullah |
| 10,519,357 B2 | 12/2019 | Amanullah |
| 10,597,575 B2 | 3/2020 | Amanullah et al. |
| 10,889,747 B1 * | 1/2021 | Amanullah ............ C09K 8/035 |
| 2002/0010100 A1 | 1/2002 | Wood |
| 2004/0023813 A1 | 2/2004 | Burts, III |
| 2004/0129460 A1 | 7/2004 | Macquoid et al. |
| 2004/0244978 A1 | 12/2004 | Shaarpour |
| 2005/0113260 A1 | 5/2005 | Wood |
| 2005/0124502 A1 | 6/2005 | Shaarpour |
| 2005/0217852 A1 | 10/2005 | Bennett et al. |
| 2006/0106136 A1 | 5/2006 | Abu-Sharkh |
| 2006/0122069 A1 | 6/2006 | Burts, III |
| 2006/0157247 A1 | 7/2006 | Burts, III |
| 2006/0160907 A1 | 7/2006 | Stamp |
| 2009/0054269 A1 | 2/2009 | Chatterji et al. |
| 2009/0286697 A1 | 11/2009 | Shaarpour |
| 2009/0305038 A1 | 12/2009 | Duran et al. |
| 2009/0305911 A1 | 12/2009 | Pomerleau |
| 2010/0152070 A1 | 6/2010 | Ghassemzadeh |
| 2010/0181110 A1 | 7/2010 | Harr |
| 2010/0193244 A1 | 8/2010 | Hoskins |
| 2010/0230164 A1 | 9/2010 | Pomerleau |
| 2010/0230169 A1 | 9/2010 | Pomerleau |
| 2011/0214870 A1 | 9/2011 | Shaarpour |
| 2011/0278006 A1 | 11/2011 | Sanders |
| 2012/0055852 A1 | 3/2012 | Soane et al. |
| 2012/0157354 A1 | 6/2012 | Li et al. |
| 2012/0247763 A1 | 10/2012 | Rakitsky et al. |
| 2013/0025863 A1 | 1/2013 | Lin et al. |
| 2013/0087331 A1 | 4/2013 | Karcher et al. |
| 2013/0206479 A1 | 8/2013 | Smith |
| 2014/0038857 A1 | 2/2014 | Miller et al. |
| 2014/0102987 A1 | 4/2014 | Yusuf et al. |
| 2014/0110177 A1 | 4/2014 | Harr |
| 2014/0238674 A1 | 4/2014 | Savari et al. |
| 2014/0135237 A1 | 5/2014 | Villarreal, Jr. et al. |
| 2014/0209290 A1 | 7/2014 | Jamison et al. |
| 2014/0231082 A1 | 8/2014 | Jamison et al. |
| 2014/0262281 A1 | 9/2014 | Kulkarni et al. |
| 2014/0318793 A1 | 10/2014 | Van Petergem et al. |
| 2014/0353043 A1 | 12/2014 | Amanullah et al. |
| 2015/0008044 A1 | 1/2015 | Fontenot |
| 2015/0051120 A1 | 2/2015 | Hurd et al. |
| 2015/0072901 A1 | 3/2015 | Samuel et al. |
| 2015/0166875 A1 | 6/2015 | Bird et al. |
| 2015/0247081 A1 | 9/2015 | Dillon et al. |
| 2015/0251156 A1 | 9/2015 | Yusuf et al. |
| 2015/0292279 A1 | 10/2015 | Wang |
| 2016/0060985 A1 | 3/2016 | Lin et al. |
| 2016/0096988 A1 | 4/2016 | Lin et al. |
| 2016/0137903 A1 | 5/2016 | Friedheim et al. |
| 2016/0177164 A1 | 6/2016 | Dillon et al. |
| 2016/0222274 A1 | 8/2016 | Hoskins |
| 2016/0222275 A1 | 8/2016 | Galindo et al. |
| 2016/0257869 A1 | 9/2016 | Kulkarni et al. |
| 2016/0264839 A1 | 9/2016 | Mata et al. |
| 2016/0289528 A1 | 10/2016 | Wagle et al. |
| 2016/0312100 A1 | 10/2016 | Amanullah et al. |
| 2016/0333257 A1 | 11/2016 | Smith, Jr. et al. |
| 2017/0058180 A1 | 3/2017 | Hossain et al. |
| 2017/0137688 A1 | 5/2017 | Amanullah |
| 2017/0166795 A1 | 6/2017 | Walker et al. |
| 2017/0240791 A1 | 8/2017 | Oliveira et al. |
| 2017/0298263 A1 | 10/2017 | Amanullah |
| 2018/0002588 A1 | 1/2018 | Amanullah |
| 2018/0002589 A1 | 1/2018 | Amanullah |
| 2018/0016483 A1 | 1/2018 | Amanullah |
| 2018/0057729 A1 | 3/2018 | Amanullah |
| 2018/0086962 A1 | 3/2018 | Amanullah |
| 2018/0127632 A1 | 5/2018 | Amanullah |
| 2018/0201819 A1 | 7/2018 | Amanullah |
| 2019/0177593 A1 | 6/2019 | Amanullah |
| 2019/0177594 A1 | 6/2019 | Amanullah |
| 2019/0177595 A1 | 6/2019 | Amanullah |
| 2019/0185731 A1 | 6/2019 | Amanullah |
| 2019/0185732 A1 | 6/2019 | Amanullah |
| 2019/0194519 A1 | 6/2019 | Amanullah |
| 2019/0233705 A1 | 8/2019 | Amanullah et al. |
| 2019/0270924 A1 | 9/2019 | Amanullah |

(56) References Cited

U.S. PATENT DOCUMENTS

| | | | |
|---|---|---|---|
| 2019/0292860 | A1 | 9/2019 | Amanullah |
| 2019/0292861 | A1 | 9/2019 | Amanullah |
| 2019/0375973 | A1 | 12/2019 | Amanullah |
| 2020/0002592 | A1 | 1/2020 | Amanullah |
| 2020/0079987 | A1 | 3/2020 | Amanullah |
| 2020/0079988 | A1 | 3/2020 | Amanullah |

FOREIGN PATENT DOCUMENTS

| | | | |
|---|---|---|---|
| CN | 101560084 | A | 10/2009 |
| CN | 101724383 | A | 6/2010 |
| CN | 102127403 | A | 7/2011 |
| CN | 203035080 | U | 7/2013 |
| CN | 103570298 | A | 2/2014 |
| CN | 103740346 | A | 4/2014 |
| CN | 104087274 | A | 10/2014 |
| CN | 104419392 | A | 3/2015 |
| CN | 105541159 | A | 5/2016 |
| GB | 2506603 | A | 4/2014 |
| GB | 2518441 | A | 3/2015 |
| JP | 0671171 | A | 3/1994 |
| WO | 200153429 | A1 | 7/2001 |
| WO | 2004013448 | A2 | 2/2004 |
| WO | 2010019535 | A2 | 2/2010 |
| WO | 2010088484 | A2 | 8/2010 |
| WO | 2010142370 | A1 | 12/2010 |
| WO | 2012037600 | A1 | 3/2012 |
| WO | 2012061187 | A2 | 5/2012 |
| WO | 2013039938 | A1 | 3/2013 |
| WO | 2014008598 | A1 | 1/2014 |
| WO | 2014197417 | A1 | 12/2014 |
| WO | 2015142156 | A1 | 9/2015 |
| WO | 2015199652 | A1 | 12/2015 |
| WO | 2016019416 | A1 | 2/2016 |
| WO | 2016028470 | A1 | 2/2016 |
| WO | 2016172287 | A1 | 10/2016 |
| WO | 2017087434 | A1 | 5/2017 |
| WO | 2018005575 | A1 | 1/2018 |
| WO | 2018013619 | A1 | 1/2018 |

OTHER PUBLICATIONS

"Wood Shop News, Issue #08 Hard and softwoods, a unique food bank, and more news from around the shop" available as of Oct. 8, 2018 at the website: https://www.wooden-box-maker.com/Wood_Shop_News-hardwoods-and-softwoods.html.

Alawad, Musaed N.J., et al.; "Superior fracture-seal material using crushed date palm seeds for oil and gas well drilling operations" Journal of King Saud University—Engineering Sciences (2017); pp. 1-7.

Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.

Alsaba, M. et al.; "Review of lost circulation materials and treatments with an updated classification." AADE National Technical Conference and Exhibition, Houston, TX, Apr. 2014; pp. 1-9.

Amanullah, et al.; "Application of an indigenous eco-friendly raw material as fluid loss additive", Journal of Petroleum Science and Engineering, vol. 139, (2016); pp. 191-197.

Amanullah; "Characteristics, behavior and performance of ARC Plug—A date seed-based sized particulate LCM." SPE Kingdom of Saudi Arabia Annual Technical Symposium and Exhibition. Society of Petroleum Engineers, 2016; pp. 1-9.

BakerHughes.com "SOLUFLAKE Flaked Calcium Carbonate" (XP055401101) Jan. 8, 2016; p. 1.

International Search Report and Written Opinion for International Application No. PCT/US2016/062130; Report dated Jan. 27, 2017; pp. 1-12.

International Search Report and Written Opinion for International Application No. PCT/US2017/027287; report dated Sep. 13, 2017; 11 pages.

International Search Report and Written Opinion for International Application No. PCT/US2017/039614; Report dated Sep. 11, 2017; pp. 1-12.

International Search Report and Written Opinion for International Application No. PCT/US2017/039616; Report dated Sep. 11, 2017; pp. 1-11.

International Search Report and Written Opinion for International Application No. PCT/US2017/047877; Report dated Oct. 27, 2017; pp. 1-15.

International Search Report and Written Opinion for International Application No. PCT/US2017/053355; International filing date Sep. 26, 2017; Report dated Jan. 17, 2018; pp. 1-14.

International Search Report and Written Opinion for International Application No. PCT/US2017/060079; International Filing Date Nov. 6, 2017; Report dated Dec. 18, 2017; pp. 1-14.

International Search Report and Written Opinion for International Application No. PCT/US2017/067179 International Filing Date Dec. 19, 2017; Report dated Feb. 21, 2018; pp. 1-14.

International Search Report and Written Opinion for International Application No. PCT/US2019/016614 report dated Jun. 3, 2019; pp. 1-12.

International Search Report and Written Opinion for International Application No. PCT/US2019/022843 report dated Jun. 3, 2019; pp. 1-13.

International Search Report and Written Opinion for International Application No. PCT/US2017/041611; International Filing Date Jul. 12, 2017; Report dated Oct. 27, 2017 (pp. 1-15).

International Search Report and Written Opinion for International Application No. PCT/US2018/034291; International Filing Date May 24, 2018; Report dated Jul. 31, 2018 (pp. 1-11).

International Search Report and Written Opinion for International Application No. PCT/US2018/048423; International Filing Date Aug. 29, 2018; Report dated Nov. 29, 2018 (pp. 1-12).

Saudi Aramco "Local palm trees support technical solutions" Dhahran, Aug. 4, 2015; available as of Sep. 19, 2018 at the website: www.saudiaramco.com/en/home/news-media/news/local-palm-trees-support.html.

Wajheeuddin, M. et al.; "An Experimental Study on Particle Sizing of Natural Substitutes for Drilling Fluid Applications." Journal of Nature Science and Sustainable Technology vol. 8, No. 2 (2014); pp. 1-14.

Wajheeuddin, Mohammed; "Development of an Environmentally-Friendly Drilling Fluid Using Date Seeds and Grass" Master's thesis, King Fahd University of Petroleum & Minerals, 2014; pp. 1-138.

* cited by examiner

COMPOSITION AND METHOD OF MANUFACTURING OF WHOLE AND GROUND DATE PALM SEED LOST CIRCULATION MATERIAL (LCM)

BACKGROUND

Field of the Disclosure

The present disclosure generally relates to controlling lost circulation in a wellbore during drilling with a drilling fluid. More specifically, embodiments of the disclosure relate to a lost circulation materials (LCMs) for total and severe loss zones.

Description of the Related Art

Lost circulation is one of the frequent challenges encountered during drilling operations. Lost circulation can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs.

SUMMARY

Total and severe loss zones may contain gaps, fractures, and vugs having sizes in the range of 1000 micrometers ($\mu$m) to 50000 $\mu$m. A severe loss zone may refer to loss zones exhibiting fluid losses of 100 barrels/hour (bbl/hr) or greater. A total loss zone may refer to a loss zone exhibiting no fluid return. Existing particulate or chip LCMs may be unable to create bridges and flow barriers in the openings in these total and severe loss zones and may limit the effectiveness of LCM treatment jobs. For example, particulate LCMs may be unable to create effective bridges and flow barriers in the sizes of gaps, fractures, and vugs located in total and severe loss zones. In another example, chips LCMs may have a specific gravity greater than 2, making such chip LCMs difficult to transport into loss zones due to their settlement and sagging in the circulation system. Due to the particle mass and resulting buoyancy force acting on these chip LCMs, the effective transportation of these LCMs into the loss zones is one of the major challenges for successful placement of loss circulation materials.

In one embodiment, a method to reduce lost circulation of a drilling fluid in a wellbore in a formation is provided. The method includes introducing an altered drilling fluid into the wellbore while drilling such that a loss circulation material (LCM) contacts a lost circulation zone, such that the altered drilling fluid includes the drilling fluid and the LCM. The LCM consists of a plurality of whole date palm seeds and a plurality of chips produced from ground date palm seeds, each of the plurality of chips having a size in the range of greater than 1 micrometer ($\mu$m) to less than 6730 $\mu$m. The plurality of whole date palm seeds consists of a first group of whole date palm seeds, each of the first group of whole date palm seeds having a length in the range of 28 millimeters (mm) to 36 mm, a second group of whole date palm seeds, each of the second group of whole date palm seeds having a length in the range of 20 mm to 28 mm, a third group of whole date palm seeds, each of the third group of whole date palm seeds having a length in the range of 12 mm to less than 20 mm.

In some embodiments, the altered drilling fluid consists of the drilling fluid and the LCM. In some embodiments, the plurality of whole date palm seeds is in the range of 25 weight (wt) % to 75 wt % and the plurality of chips is in the range of 75 wt % to 25 wt %. In some embodiments, the first group of whole date palm seeds is in the range of 40 weight (wt) % to 50 wt % of the LCM, the second group of whole date palm seeds is in the range of 30 wt % to 40 wt % of the LCM, and third group of whole date palm seeds is in the range of 15 wt % to 25 wt %. In some embodiments, the drilling fluid is a water-based drilling mud or an oil-based drilling mud. In some embodiments, the plurality of chips are produced from untreated date palm seeds and the plurality of whole date palm seeds consists of untreated whole date palm seeds. In some embodiments, the plurality of whole date palm seeds are produced by washing whole date palm seeds and drying the whole date palm seeds after the washing. The drying includes air-drying the whole date palm seeds for a first time period of in the range of 12 hours to 24 hours, hot rolling the whole date palm seeds at a temperature of at least 100° C. for a second time period of at least two hours, and cooling the hot-rolled whole date palm seeds for a third time period of at least two hours. The plurality of whole date palm seeds are further produced by sorting the dried whole date palm seeds into the first group of whole date palm seeds, the second group of whole date palm seeds, and the third group of whole date palm seeds. In some embodiments, the plurality of chips are produced by washing date palm seeds and drying the date palm seeds after the washing. The drying includes air-drying the whole date palm seeds for a first time period of in the range of 12 hours to 24 hours, hot rolling the whole date palm seeds at a temperature of at least 100° C. for a second time period of at least two hours, and cooling the hot-rolled date palm seeds for a third time period of at least two hours. The plurality of chips are further produced by grinding the dried date palm seeds and sorting the ground date palm seeds into the plurality of chips. In some embodiments, the LCM has a specific gravity of 1.1.

In another embodiment, an altered drilling fluid is provided. The altered drilling fluid includes a drilling fluid and a lost circulation material (LCM). The LCM consists of a plurality of whole date palm seeds and a plurality of chips produced from ground date palm seeds, each of the plurality of chips having a size in the range of greater than 1 micrometer ($\mu$m) to less than 6730 $\mu$m. The plurality of whole date palm seeds consists of a first group of whole date palm seeds, each of the first group of whole date palm seeds having a length in the range of 28 millimeters (mm) to 36 mm, a second group of whole date palm seeds, each of the second group of whole date palm seeds having a length in the range of 20 mm to 28 mm, a third group of whole date palm seeds, each of the third group of whole date palm seeds having a length in the range of 12 mm to less than 20 mm.

In some embodiments, the altered drilling fluid consists of the drilling fluid and the LCM. In some embodiments, the plurality of whole date palm seeds is in the range of 25 weight (wt) % to 75 wt % and the plurality of chips is in the range of 75 wt % to 25 wt %. In some embodiments, the first group of whole date palm seeds is in the range of 40 weight (wt) % to 50 wt % of the LCM, the second group of whole date palm seeds is in the range of 30 wt % to 40 wt % of the LCM, and third group of whole date palm seeds is in the range of 15 wt % to 25 wt %. In some embodiments, the drilling fluid is a water-based drilling mud or an oil-based drilling mud. In some embodiments, the plurality of chips are produced from untreated date palm seeds and the plurality of whole date palm seeds consists of untreated whole date palm seeds. In some embodiments, the plurality of whole date palm seeds are produced by washing whole date palm seeds and drying the whole date palm seeds after the washing. The drying includes air-drying the whole date palm seeds for a first time period of in the range of 12 hours to 24 hours, hot rolling the whole date palm seeds at a temperature of at least 100° C. for a second time period of at least two hours, and cooling the hot-rolled whole date palm seeds for a third time period of at least two hours. The plurality of whole date palm seeds are further produced by sorting the dried whole date palm seeds into the first group of whole date palm seeds, the second group of whole date palm seeds, and the third group of whole date palm seeds. In some embodiments, the plurality of chips are produced by washing date palm seeds and drying the date palm seeds after the washing. The drying includes air-drying the whole date palm seeds for a first time period of in the range of 12 hours to 24 hours, hot rolling the whole date palm seeds at a temperature of at least 100° C. for a second time period of at least two hours, and cooling the hot-rolled date palm seeds for a third time period of at least two hours. The plurality of chips are further produced by grinding the dried date palm seeds and sorting the ground date palm seeds into the plurality of chips.

In another embodiment, a lost circulation material (LCM) composition is provided. The LCM composition includes a plurality of whole date palm seeds and a plurality of chips produced from ground date palm seeds, each of the plurality of chips having a size in the range of greater than 1 micrometer (µm) to less than 6730 µm. The plurality of whole date palm seeds consists of a first group of whole date palm seeds, each of the first group of whole date palm seeds having a length in the range of 28 millimeters (mm) to 36 mm, a second group of whole date palm seeds, each of the second group of whole date palm seeds having a length in the range of 20 mm to 28 mm, a third group of whole date palm seeds, each of the third group of whole date palm seeds having a length in the range of 12 mm to less than 20 mm. In some embodiments, the plurality of whole date palm seeds is in the range of 25 weight (wt) % to 75 wt % and the plurality of chips is in the range of 75 wt % to 25 wt %. In some embodiments, the first group of whole date palm seeds is in the range of 40 weight (wt) % to 50 wt % of the LCM, the second group of whole date palm seeds is in the range of 30 wt % to 40 wt % of the LCM, and third group of whole date palm seeds is in the range of 15 wt % to 25 wt %. In some embodiments, the plurality of chips are produced from untreated date palm seeds and the plurality of whole date palm seeds consists of untreated whole date palm seeds.

In another embodiment, a method of manufacturing a lost circulation material (LCM) is provided. The method includes obtaining whole date palm seeds, washing whole date palm seeds, and drying the whole date palm seeds after the washing. The drying includes air-drying the whole date palm seeds for a first time period of in the range of 12 hours to 24 hours, hot rolling the whole date palm seeds at a temperature of at least 100° C. for a second time period of at least two hours, and cooling the hot-rolled whole date palm seeds for a third time period of at least two hours. The method further includes sorting a first plurality of the dried whole date palm seeds into a first group of whole date palm seeds each having a length greater in the range of 28 millimeters (mm) to 36 mm, a second group of whole date palm seeds each having a length in the range of 20 mm to 28 mm; and a third group of whole date palm seeds each having a length in the range of 12 mm to less than 20 mm. The method also includes grinding a second plurality of the dried whole date palm seeds and sorting the ground date palm seeds into a plurality of chips, each chip having a size in the range of greater than 1 micrometer (µm) to less than 6730 µm. Additionally, the method includes mixing the first group of whole date palm seeds, the second group of whole date palm seeds, the third group of whole date palm seeds, and the plurality of chips into a mixture.

In some embodiments, washing the whole date palm seeds includes washing the whole date palm seeds using pressurized water with mechanical agitation. In some embodiments, sorting the dried whole date palm seeds includes using a plurality of sieves. In some embodiments, sorting the ground date palm seeds includes using a plurality of sieve. In some embodiments, the first group of whole date palm seeds is in the range of 40 weight (wt) % to 50 wt % of the LCM, the second group of whole date palm seeds is in the range of 30 wt % to 40 wt % of the LCM, and third group of whole date palm seeds is in the range of 15 wt % to 25 wt %.

DETAILED DESCRIPTION

Figure 1:
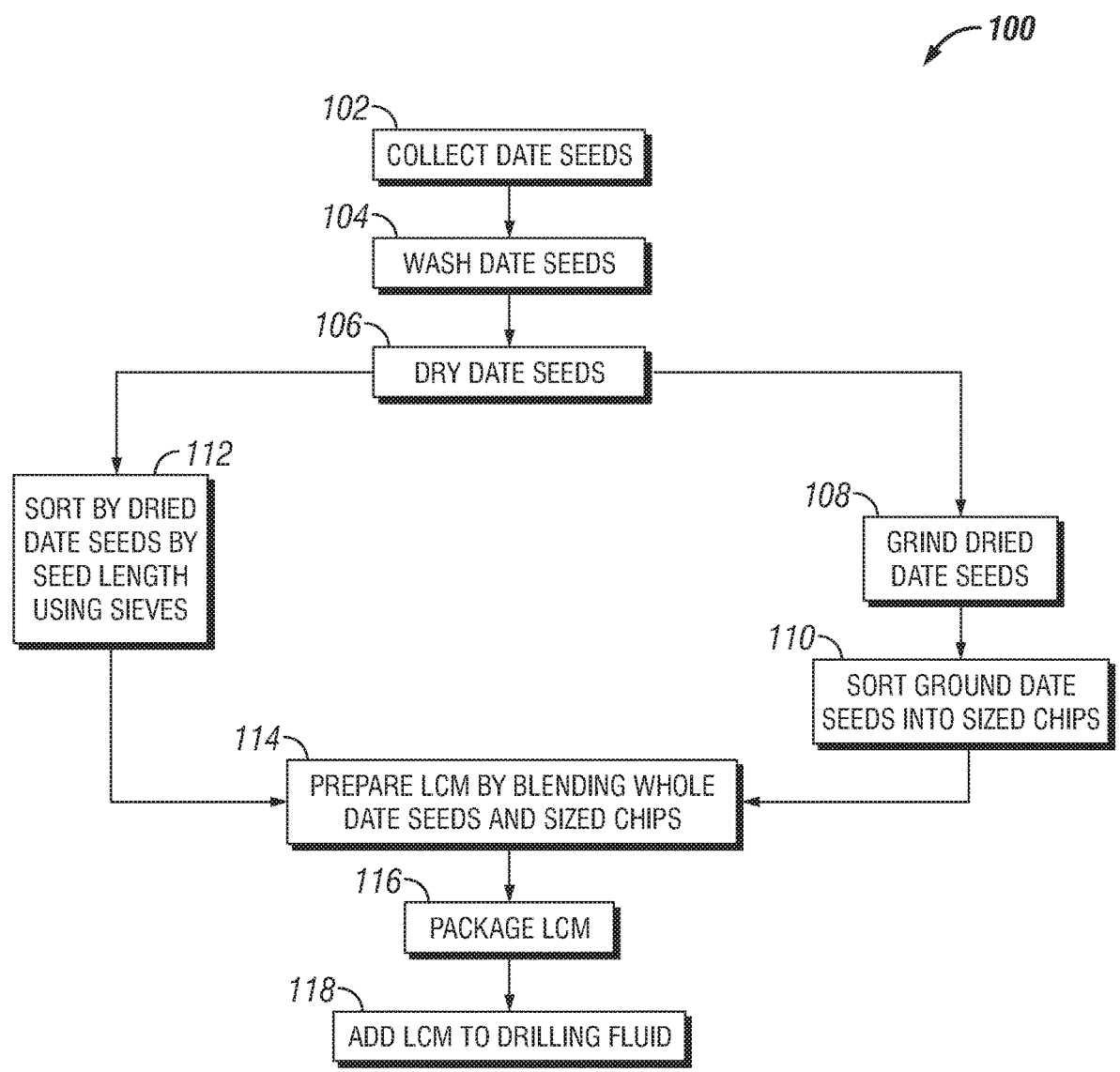
FIG. 1 is a process for the manufacture and use of a whole and ground date palm seed LCM in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a whole and ground date palm seed lost circulation material (LCM) having a mixture of differently sized whole date palm seeds and chips formed from ground date palm seeds. As used in the disclosure, the term date palm seeds (also referred to as "date seeds" or "date tree seeds") refers to the seeds produced from date trees (also referred to as "date palms"), such as used in the production of date fruits (also referred to as "dates").

The whole and ground date palm seed LCM includes whole date palm seeds having a length in the range of 12 millimeters (mm) to 36 mm and a width in the range of 6 mm to 13 mm. The whole date palm seeds may have a groove along the length of the seeds with a groove depth in the range of 1 mm to 2 mm. In some embodiments, the whole and ground date palm seed LCM includes "large" whole date palm seeds (date palm seeds having a length in the range of 28 millimeters (mm) to 36 mm), "medium" whole date palm seeds (date palm seeds having a length in the range of 20 mm to 28 mm) and "small" whole date palm seeds (date palm seeds having a length in the range of 12 mm to 20 mm), as determined by sieve sizing of whole date palm seeds. In some embodiments, the whole and ground date palm seed LCM includes large date palm seeds in the range of 40 weight (wt) % to 50%, medium date palm seeds in the range of 30 wt % to 40 wt %, and small date palm seeds in the range of 15 wt % to 25 wt %.

The whole and ground date palm seed LCM includes chips formed from ground date palm seeds. The chips have a particle size in the range of greater than 1 μm to less than 6730 μm. For example, in some embodiments the whole and ground date palm seed LCM includes chips having a particle size in the range of greater than 3360 μm to less than 6730 μm, chips having a particle size in the range of greater than 2000 μm to less than 3360 μm, chips having a particle size in the range of greater than 841 μm to less than 2000 μm, chips having a particle size in the range of greater than 400 μm to less than 841 μm, and chips having a particle size in the range of greater than 1 μm to less than 400 μm.

In some embodiments, the whole and ground date palm seed LCM includes an amount of whole date palm seeds in the range of 25 weight (wt) % to 75 wt % and an amount of crushed date palm seeds in the range of 75 wt % to 25%. For example, in some embodiments, the whole and ground date palm seed LCM includes 25 wt % whole date palm seeds and 75 wt % crushed date palm seeds. In other embodiments, the whole and ground date palm seed LCM includes 50 wt % whole date palm seeds and 50 wt % crushed date palm seeds. In other embodiments, the whole and ground date palm seed LCM includes 75 wt % whole date palm seeds and 25 wt % crushed date palm seeds.

In some embodiments, the whole and ground date palm seed LCM may have a log on grinding index (LOG I) of about 3. The specific gravity of the whole and ground date palm seed LCM may be about 1.1. The density of the whole and ground date palm seed LCM may be about 1.1 grams per cubic centimeter ($g/cm^3$) The density of the whole and ground date palm seed LCM (that is, a density only slightly greater than water) may ensure minimal to no settlement of the LCM in a fluid tank and fluid circulation system (for example, a drilling fluid circulation system), minimal to no sagging in a deviated hole sections, and minimal to no bedding in horizontal wellbores. When introduced into a loss zone, the whole and ground date palm seed LCM may form plugs, seals, bridges, flow barriers, or other structures in gaps, fractures, vugs, and other openings in the loss zone that have sizes greater than 5 mm. In some embodiments, the whole and ground date palm seed LCM may form plugs, seals, bridges, flow barriers, or other structures in gaps, fractures, vugs, and other openings having sizes 10 mm or less. The whole and ground date palm seed LCM may form plugs, seals, bridges, flow barriers, or other structures in gaps, fractures, vugs, and other openings having a sizes greater than 10 mm.

The date palm seeds may be obtained from pruning waste and date processing plants to provide a sustainable source of material for the whole and ground date palm seed LCM. The date palm seeds are obtained from the species phoenix dactylifera. It should be appreciated that, in some embodiments, the date palm seeds may be obtained from genetically modified date trees (that is, genetically modified organisms (GMOs)).

In some embodiments, the date palm seeds may include untreated date palm seeds to preserve the environmentally-friendly and biodegradable properties of the manufacturing process, the date palm seeds, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass heating to remove moisture but includes chemical treatments. In such embodiments, the whole date palm seeds may be manufactured without treating before, during, or after washing, drying, or any other processing.

The whole and ground date palm seed LCM may be added to a carrier fluid or a drilling fluid that is circulated (for example, via a pump) to position the LCM into contact with a lost circulation zone in a wellbore. In some embodiments, the whole and ground date palm seed LCM may be added directly to a drilling fluid, such as a drilling mud, to create an altered drilling fluid having the whole and ground date palm seed LCM. For example, in some embodiments, the whole and ground date palm seed LCM may be added to (for example, blended with) an oil-based drilling mud or a water-based drilling mud. In some embodiments, the whole and ground date palm seed LCM may be added at the mud pit of a mud system. After addition of the whole and ground date palm seed LCM to a drilling fluid, the altered drilling fluid may be circulated at a pump rate effective to position the altered drilling fluid into contact with a lost circulation zone in a wellbore, such that the whole and ground date palm seed LCM alters the lost circulation zone (for example, by forming structures in gaps, fractures, vugs, and other openings in a formation).

In some embodiments, the whole and ground date palm seed LCM may have a concentration in the range of about 10 pounds-per-barrel (ppb) to about 50 ppb in a drilling fluid. In some embodiments having moderate loss zones, the whole and ground date palm seed LCM may have a concentration in the range of about 15 ppb to about 30 ppb in a drilling fluid. In some embodiments, the drilling fluid or carrier fluid may be a water-based mud, such as a bentonite mud, a potassium chloride (KCl)-polymer mud, a low solids non-dispersed (LSND) mud, a calcium chloride ($CaCl^2$)-polymer mud, a sodium chloride (NaCl)-polymer mud, or other water-based muds. An example bentonite mud may include water, bentonite, caustic soda, and soda ash. An example KCl-polymer mud may include water, caustic soda, soda ash, bentonite, KCl, XC polymer, and a filtrate control additive. In some embodiments, the drilling fluid or carrier fluid may an oil-based mud, such as diesel-, mineral-, or synthetic-oil based muds.

FIG. 1 depicts a process 100 for the production and use of a whole and ground date palm seed LCM in accordance with an example embodiment of the disclosure. As shown in FIG. 1, whole date palm seeds may be collected (block 102). In some instances, the whole date palm seeds are collected from date tree waste produced by date tree farming and date processing industries. The date palm seeds may be washed to remove fruit particles and other debris and foreign substances (block 104), such as by pressurized water or an air jet in a closed loop system with mechanical agitation. The washed whole date palm seeds may be then be dried using one or more techniques (block 106). In some embodiments, the whole date palm seeds may be dried using hot rolling to improve the ductility of the date palm seeds. In such embodiments, the washed whole date palm seeds are first air-dried at ambient temperature for a time period in the range of 12 hours to 24 hour. As will be appreciated, the air drying may reduce the thermal energy used in further drying by hot rolling. The air-dried date palm seeds may then be hot rolled (for example, in a roller oven or hot rolling drum) at a temperature of at least 100° C. for a time period in the range of 2 hours to 3 hours, then cooled at ambient conditions (temperature and pressure) for a time period of at least 2 hours to reduce the brittleness and increase the ductility of the date palm seeds, preventing the conversion of date palm seeds into powder during the grinding process.

The dried whole date palm seeds may then be ground into chips (block 108) using a commercial grinder. The chips may be separated and sorted into different sizes using sieves of the appropriate mesh sizes (block 110). In some embodiments, the ground date palm seeds (chips) may be separated using a sieve of 8000 µm mesh size. In some embodiments, the chips may be sorted using a sieve of 6730 µm (No. 3 mesh size, a sieve of 3360 µm (No. 6) mesh size, a sieve of 2000 µm (No. 10) mesh size, a sieve of 841 µm (No. 20) mesh size, and a sieve of 400 µm (No. 40) mesh size.

The dried whole date palm seeds may be sorted by seed length into different sizes using sieves of the appropriate mesh sizes (block 112). For example, the dried whole date palm seeds may be sorted into large whole date palm seeds having a length in the range of 28 mm to 36 mm, medium whole date palm seeds having a length in the range of 20 mm to 28 mm, and small whole date palm seeds having a length in the range of 12 mm to 20 mm.

The whole date palm seeds of different sizes and the ground date palm seeds (that is, the chips) may be blended in the desired amounts to produce the whole and ground date palm seed LCM (block 114). For example, the whole and ground date palm seed LCM includes an amount of whole date palm seeds in the range of 25 weight (wt) % to 75 wt % and an amount of crushed date palm seeds in the range of 75 wt % to 25%. The blended whole date palm seeds and crushed date palm seeds may be packed for transportation and use (block 116). A suitable amount of the blended whole date palm seeds and crushed date palm seeds may then be transported to an oil and gas operations site for use as an LCM.

The whole and ground date palm seed LCM may be added directly to a drilling fluid (block 118), such as a drilling mud, to create an altered drilling fluid having the whole and ground date palm seed LCM. For example, in some embodiments, the whole and ground date palm seed LCM may be added to (for example, blended with) an oil-based drilling mud or a water-based drilling mud. In some embodiments, the whole and ground date palm seed LCM may be added at the mud pit of a mud system.

After addition of the whole and ground date palm seed LCM to a drilling fluid, the altered drilling fluid may be circulated at a pump rate effective to position the drilling fluid into contact with a lost circulation zone in a wellbore, such that the whole and ground date palm seed LCM alters the lost circulation zone (for example, by entering and blocking in a formation in the lost circulation zone). In some embodiments, the lost circulation zone may be a severe loss zone or a total loss zone, including loss zones having gaps, fractures, and vugs and other openings in the range of 5 millimeters (mm) to 50 mm in size. The whole and ground date palm seed LCM may form structures (for example, plugs or seals) at gaps, fractures, vugs, and other openings in a loss zone. In some embodiments, the reduced rate of lost circulation may be negligible.

In some embodiments, the whole and ground date palm seed LCM may be introduced via an open ended drill pipe to place the LCM in the lost circulation zone. In some embodiments, the whole and ground date palm seed LCM may be introduced using a bypass system (that is, a system that enables bypassing the BHA) to introduce the LCM into the wellbore.

In other embodiments, the whole and ground date palm seed LCM and one or more additional LCMs may be added to a drilling fluid, such as a drilling mud, to create an altered drilling fluid having the LCMs. For example, in some embodiments, the whole and ground date palm seed LCM and one or more additional LCMs may be added to an oil-based drilling mud or a water-based drilling mud.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of a whole and ground date palm seed LCM was prepared and evaluated against a commercially available LCMs. The example whole and ground date palm seed LCM included the following whole date palm seeds: 45 wt % large date palm seeds; 35 wt % medium date palm seeds; and 20 wt % small whole date palm seeds. The example whole and ground date palm seed LCM includes the following crushed whole date palm seeds: 0 wt % having particle size 6730 µm or greater; 30 wt having a particle size in the range of greater than 3360 µm to less than 6730 µm; 25 wt % having a particle size in the range of greater than 2000 µm to less than 3360 µm; 20 wt % having a particle size in the range of greater than 841 µm to less than 2000 µm; 15 wt having a particle size in the range of greater than 400 µm to less than 841 µm; and 10 wt having a particle size in the range of greater than 1 µm to less than 400 µm.

The mechanical stability and technical suitability of the example whole and ground date palm seed LCM was evaluated by comparison to commercially available calcium carbonate chips, 100% ground date palm seeds, and 100% whole date palm seeds, and commercially available graphite chips.

The degradation potential of the example whole and ground date palm seed LCM was evaluated by measuring the loss on grinding index (LOG I). The loss on grinding index was measured by determining the ratio of material lost after two hours of wet grinding to the original mass of the material. The wet grinding was performed to simulate the attrition effect of surface and subsurface tools and the hydrodynamic forces of circulating fluid that would impact an LCM. The wet grinding test used a test cell to simulate a piece of a wellbore, a free rotating metal cylinder to simulate the attrition effect of surface and subsurface tools and equipment, and water as the carrier fluid to simulate hydrodynamic forces. The wet grinding test used rotating equipment to the rotate the test cell at a rotational speed of about 35 revolutions per minute (rpm) to simulate aggressive hydrodynamic forces The example whole and ground date palm seed LCM was compared against three commercially available calcium carbonate chips, 100% crushed date palm seeds, and 100% whole date palm seeds. The LOG I of the each of the three calcium carbonate chips was measured using the same testing conditions. About 20 to 25 grams (g) of the example whole and ground date palm seed LCM or the calcium carbonate ($CaCO_3$) chips were placed in the test cell and rotated at the rotational speed for a time period of about two hours at room temperature. The mass of the material lost was measured and used to determine the LOG I from the original 25 g.

Figure 2:
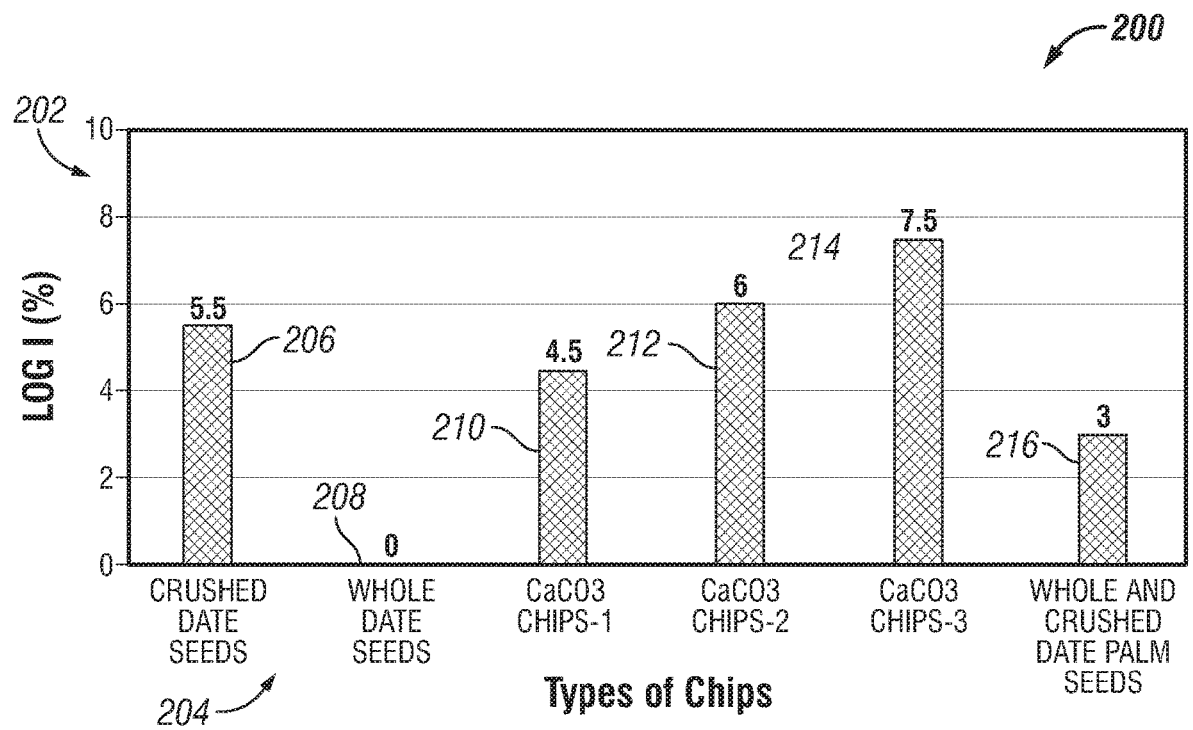
FIG. 2 is a bar graph depicting the measured log on grinding index (LOG I) for 100% ground date palm seeds, 100% whole date palm seeds, three commercially available calcium carbonate chips, and an example whole and ground date palm seed LCM in accordance with an embodiment of the disclosure.

FIG. 2 is a bar graph 200 depicting the measured LOG I for 100% crushed date palm seeds, 100% whole date palm seeds, each of the three commercially available calcium carbonate chips, and the example whole and ground date palm seed LCM. The y-axis 202 depicts the LOG I (in percentage (%)), and the x-axis 204 depicts each tested material. As shown in FIG. 2, the 100% crushed date palm seeds (illustrated by bar 206) had a LOG I of 5.5, and the 100% whole date palm seeds (illustrated by bar 208) had a LOG I 0. As also shown in FIG. 2, the first commercially available calcium carbonate chips (illustrated by bar 210) had a LOG I of 4.5, the second commercially available calcium carbonate chips (illustrated by bar 212) had a LOG I of 6, and the third commercially available calcium carbonate (illustrated by bar 214) had a LOG I of 7.5. Finally, as shown in FIG. 2, the example whole and crushed date palm seeds LCM (illustrated by bar 216) had a LOG of 3; the material loss was likely due to irregularly shaped grinded chips. Thus, the example whole and crushed date palm seeds LCM exhibited on average similar performance to the commercially available calcium carbonate chips and better performance as compared to the 100% crushed date palm seeds. The results of the degradation testing show that the whole and ground date palm seed LCM has similar degradation resistance to the calcium carbonate chips but better degradation resistance than the 100% crushed date palm seeds when subjected to simulated mechanical and hydrodynamic forces encountered in a wellbore during operations and fluid circulation.

Figure 3:
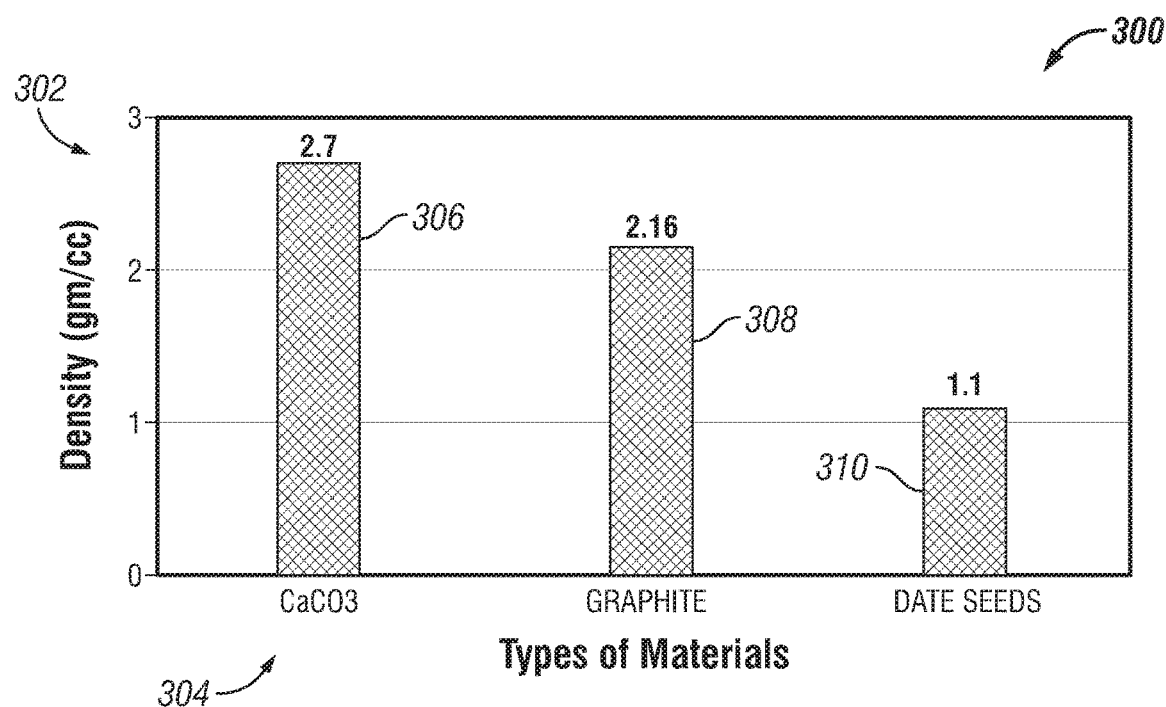
FIG. 3 is a bar graph of the specific gravities of an example whole and ground date palm seed LCM and two commercially available chips in accordance with an embodiment of the disclosure.

The density of the example whole and crushed date palm seeds LCM was also determined and compared against commercially available calcium carbonate chips and commercially available graphite chips. FIG. 3 is a bar graph 300 of the specific gravities of the example whole and crushed date palm seeds LCM and the two commercially available chips. The y-axis 302 corresponds to the specific gravity, and the x-axis 304 corresponds to each material. As shown in FIG. 4, the commercially available calcium carbonate chips (illustrated by bar 306) have a specific gravity of 2.7, and the commercially available graphite chips (illustrated by bar 308) have a specific gravity of 2.16. As also shown in FIG. 3, the whole and crushed date palm seeds LCM (illustrated by bar 310) has a specific gravity of 1.1. Thus, the whole and crushed date palm seeds LCM has a specific gravity about 2.45 times lower than the commercially available calcium carbonate chips and about 1.9 times lower than the commercially available graphite chips. As compared to the calcium carbonate chips or graphite chips, the lower specific gravity of the example date palm seed-based chip LCM may enable easier suspension of the LCM in water-based drilling fluids or carrier fluids and reduce or eliminate settlement or sagging while circulating, thus providing for easier placement in a loss zone and increasing the likelihood of a successful LCM treatment.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method to reduce lost circulation of a drilling fluid in a wellbore in a formation, comprising:
    introducing an altered drilling fluid into the wellbore while drilling such that a loss circulation material (LCM) contacts a lost circulation zone, wherein the altered drilling fluid comprises the drilling fluid and the LCM, wherein the LCM consists of:
    a plurality of whole date palm seeds and a plurality of chips produced from ground date palm seeds, each of the plurality of chips having a size in the range of greater than 1 micrometer (μm) to less than 6730 μm,
    wherein the plurality of whole date palm seeds consists of:
        a first group of whole date palm seeds, each of the first group of whole date palm seeds having a length in the range of 28 millimeters (mm) to 36 mm;
        a second group of whole date palm seeds, each of the second group of whole date palm seeds having a length in the range of 20 mm to 28 mm; and
        a third group of whole date palm seeds, each of the third group of whole date palm seeds having a length in the range of 12 mm to less than 20 mm.

2. The method of claim 1, wherein the altered drilling fluid consists of the drilling fluid and the LCM.

3. The method of claim 1, wherein the plurality of whole date palm seeds is in the range of 25 weight (wt) % to 75 wt % and the plurality of chips is in the range of 75 wt % to 25 wt %.

4. The method of claim 1, wherein the first group of whole date palm seeds is in the range of 40 weight (wt) % to 50 wt % of the LCM, the second group of whole date palm seeds is in the range of 30 wt % to 40 wt % of the LCM, and third group of whole date palm seeds is in the range of 15 wt % to 25 wt %.

5. The method of claim 1, wherein the drilling fluid comprises a water-based drilling mud or an oil-based drilling mud.

6. The method of claim 1, wherein the plurality of chips are produced from untreated date palm seeds and the plurality of whole date palm seeds consists of untreated whole date palm seeds.

7. The method of claim 1, wherein the plurality of whole date palm seeds are produced by:
  washing whole date palm seeds;
  drying the whole date palm seeds after the washing, the drying comprising:
    air-drying the whole date palm seeds for a first time period of in the range of 12 hours to 24 hours;
    hot rolling the whole date palm seeds at a temperature of at least 100° C. for a second time period of at least two hours; and
    cooling the hot-rolled whole date palm seeds for a third time period of at least two hours; and
  sorting the dried whole date palm seeds into the first group of whole date palm seeds, the second group of whole date palm seeds, and the third group of whole date palm seeds.

8. The method of claim 1, wherein the plurality of chips are produced by:
  washing date palm seeds;
  drying the date palm seeds after the washing, the drying comprising:
    air-drying the whole date palm seeds for a first time period of in the range of 12 hours to 24 hours;
    hot rolling the whole date palm seeds at a temperature of at least 100° C. for a second time period of at least two hours; and
    cooling the hot-rolled date palm seeds for a third time period of at least two hours;
  grinding the dried date palm seeds; and
  sorting the ground date palm seeds into the plurality of chips.

9. The method of claim 1, wherein the LCM comprises a specific gravity of 1.1.

\* \* \* \* \*